United States Patent
Nishihama et al.

(10) Patent No.: US 12,224,650 B2
(45) Date of Patent: Feb. 11, 2025

(54) DRIVE SYSTEM HAVING AN INDUCTION GENERATOR WITH A MAIN WINDING AND AUXILIARY WINDING

(71) Applicant: Hitachi Construction Machinery Co., Ltd., Tokyo (JP)

(72) Inventors: Kazuo Nishihama, Tokyo (JP); Masatoshi Yoshimura, Tokyo (JP); Toshihiko Watanabe, Ibaraki (JP); Toshihiko Ishida, Ibaraki (JP); Seiji Ishida, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 221 days.

(21) Appl. No.: 18/012,349

(22) PCT Filed: May 20, 2021

(86) PCT No.: PCT/JP2021/019264
§ 371 (c)(1),
(2) Date: Dec. 22, 2022

(87) PCT Pub. No.: WO2022/024515
PCT Pub. Date: Feb. 3, 2022

(65) Prior Publication Data
US 2023/0253858 A1    Aug. 10, 2023

(30) Foreign Application Priority Data

Jul. 28, 2020   (JP) .................................. 2020-127632

(51) Int. Cl.
*H02K 7/18*    (2006.01)
*H02K 1/16*    (2006.01)
(Continued)

(52) U.S. Cl.
CPC ............. *H02K 7/1807* (2013.01); *H02K 1/16* (2013.01); *H02K 1/26* (2013.01); *H02K 3/34* (2013.01); *H02P 27/06* (2013.01)

(58) Field of Classification Search
CPC .. H02K 1/16; H02K 1/26; H02K 3/34; H02K 7/1807; H02P 27/06
(Continued)

(56) References Cited

U.S. PATENT DOCUMENTS 4,292,531 A * 9/1981 Williamson ............ B60L 50/13
                                                    318/158
4,973,896 A * 11/1990 Shiga ........................ H02P 9/30
                                                    290/40 C
(Continued)

FOREIGN PATENT DOCUMENTS

JP    59-76156 A    5/1984
JP    8-79908 A     3/1996
(Continued)

OTHER PUBLICATIONS

International Preliminary Report on Patentability (PCT/IB/338 & PCT/IB/373) issued in PCT Application No. PCT/JP2021/019264 dated Feb. 9, 2023, Including English translation of document C2 (Japan—language Written Opinion (PCT/ISA/237), filed on Dec. 22, 2022) (five (5) pages).
(Continued)

*Primary Examiner* — Rashad H Johnson
(74) *Attorney, Agent, or Firm* — Crowell & Moring LLP

(57) ABSTRACT

An object of the present invention is to provide a drive system that is provided with an induction generator having a primary winding including a main winding and an auxiliary winding and a secondary conductor, can vary the voltage of the main winding, and can increase the maximum output power of the auxiliary winding. Therefore, provided
(Continued)

is a drive system, which is provided with an induction generator having a primary winding including a main winding and an auxiliary winding and a secondary conductor, including: a starting battery that starts the induction generator; a traction inverter that drives a traction motor; an auxiliary device inverter that drives an auxiliary device motor; a rectifier the input side of which is connected to the main winding and the output side of which is connected to the traction inverter; and a power generation inverter the output side of which is connected to the auxiliary winding and the input side of which is connected to the auxiliary device inverter and the starting battery.

5 Claims, 8 Drawing Sheets

(51) Int. Cl.
  *H02K 1/26* (2006.01)
  *H02K 3/34* (2006.01)
  *H02P 27/06* (2006.01)
(58) Field of Classification Search
  USPC .......................................................... 310/68 D
  See application file for complete search history.

(56) References Cited

U.S. PATENT DOCUMENTS

| | | | | |
|---|---|---|---|---|
| 8,890,492 | B2* | 11/2014 | Ueno | F02D 29/06 290/40 B |
| 9,481,252 | B1 | 11/2016 | Si et al. | |
| 2005/0116689 | A1 | 6/2005 | Fogarty et al. | |
| 2005/0276020 | A1 | 12/2005 | Ahmad | |
| 2007/0029799 | A1* | 2/2007 | Shimizu | F02D 29/06 713/323 |
| 2008/0190680 | A1* | 8/2008 | Kaneko | B60L 58/20 180/170 |
| 2009/0243294 | A1* | 10/2009 | Shiota | H02J 7/32 290/43 |
| 2010/0066400 | A1* | 3/2010 | Hendrickson | G01R 31/343 318/156 |
| 2012/0098261 | A1* | 4/2012 | Rozman | F02N 11/006 290/31 |
| 2012/0292902 | A1* | 11/2012 | Yamamura | B60L 50/16 290/31 |
| 2014/0361536 | A1* | 12/2014 | Neet | H02J 7/1423 290/31 |
| 2018/0023529 | A1* | 1/2018 | Huang | F02C 7/268 290/36 R |
| 2018/0026568 | A1* | 1/2018 | Huang | F02N 11/087 290/31 |
| 2018/0063932 | A1* | 3/2018 | Leibl | H05G 1/12 |
| 2018/0236999 | A1* | 8/2018 | Miyama | B60W 20/20 |
| 2018/0304763 | A1 | 10/2018 | Moriya et al. | |
| 2021/0075217 | A1* | 3/2021 | Kuznetsov | H02K 7/025 |
| 2022/0001854 | A1 | 1/2022 | Kadota et al. | |
| 2023/0253858 | A1* | 8/2023 | Nishihama | H02K 1/165 310/68 D |
| 2023/0370008 | A1* | 11/2023 | Nishihama | B60L 50/51 |
| 2023/0373320 | A1* | 11/2023 | Kaneko | H02P 9/30 |
| 2024/0239220 | A1* | 7/2024 | Pescetto | B60L 53/14 |

FOREIGN PATENT DOCUMENTS

| | | |
|---|---|---|
| JP | 2005-168288 A | 6/2005 |
| JP | 2018-184040 A | 11/2018 |
| JP | 2019-88170 A | 6/2019 |
| WO | WO 02/060034 A2 | 8/2002 |
| WO | WO 2018/074325 A1 | 4/2018 |
| WO | WO 2020/116272 A1 | 6/2020 |

OTHER PUBLICATIONS

International Search Report (PCT/ISA/210) issued in PCT Application No. PCT/JP2021/019264 dated Jul. 20, 2021 with English translation (four (4) pages).

Japanese-language Written Opinion (PCT/ISA/237) issued in PCT Application No. PCT/JP2021/019264 dated Jul. 20, 2021 (three (3) pages).

Extended European Search Report issued in European Application No. 21850213.6 dated Aug. 5, 2024 (8 pages).

* cited by examiner

DRIVE SYSTEM HAVING AN INDUCTION GENERATOR WITH A MAIN WINDING AND AUXILIARY WINDING

TECHNICAL FIELD

The present invention relates to a drive system using an induction generator provided with a primary winding having a main winding and an auxiliary winding.

BACKGROUND ART

A drive system using a generator provided with a primary winding having a main winding and an auxiliary winding has been known.

For example, a generator described in Patent Document 1 is provided with a three-phase winding (equivalent to a main winding) and, in addition thereto, a dedicated excitation winding (equivalent to an auxiliary winding), the three-phase winding is connected to a battery and a traction inverter via a rectifier, and the dedicated excitation winding is connected to the battery and the traction inverter via an excitation inverter.

A generator described in Patent Document 2 is provided with a main output winding (equivalent to a main winding) and an auxiliary output winding (equivalent to an auxiliary winding), the main output winding is connected to an electric power system, and the auxiliary output winding is connected to an auxiliary electric power system.

A generator described in Patent Document 3 is provided with a stator winding (equivalent to a main winding) and an auxiliary winding, the stator winding is connected to an inverter via a rectifier, and the auxiliary winding is connected to a starting electric motor and an external cooling fan. In addition, the auxiliary winding is arranged at the bottom of a slot in a stator iron core.

PRIOR ART DOCUMENT

Patent Documents

Patent Document 1: JP-1996-79908-A
Patent Document 2: JP-2005-168288-A
Patent Document 3: JP-1984-76156-A

SUMMARY OF THE INVENTION

Problem to be Solved by the Invention

In Patent Document 1, the three-phase winding (equivalent to a main winding) and, in addition thereto, the dedicated excitation winding (equivalent to an auxiliary winding) are provided, but since the three-phase winding is connected to the battery via a diode bridge (rectifier), it is necessary to set the three-phase winding to a constant voltage, and the three-phase winding cannot be set to a variable voltage.

In Patent Document 2, the main output winding (equivalent to a main winding) and the auxiliary output winding (equivalent to an auxiliary winding) are provided, but since the main output winding is connected to the electric power system, it is necessary to set the main output winding to a constant voltage, and the main output winding cannot be set to a variable voltage.

As described above, Patent Document 1 and Patent Document 2 have a problem that the three-phase winding and the main output winding (main winding) cannot be set to a variable voltage.

Even if the three-phase winding or the main output winding (main winding) can be set to a variable voltage, since the voltage of the dedicated excitation winding or the auxiliary output winding (auxiliary winding) changes in proportion to the voltage of the three-phase winding or the main output winding (main winding), a new problem arises in that when the voltage of the dedicated excitation winding or the auxiliary output winding (auxiliary winding) becomes low, the maximum value (the maximum output power of the auxiliary winding) of the electric power that can be generated from the dedicated excitation winding or the auxiliary output winding (auxiliary winding) decreases.

In Patent Document 3, the stator winding (equivalent to a main winding) and the auxiliary winding are provided, and since the stator winding is connected to the inverter via the rectifier, it is not necessary to set the stator winding to a constant voltage, and the stator winding can be set to a variable voltage. However, the electric power generated from the stator winding is distributed in a ship at a constant voltage and a constant frequency, and there is no description of operating the stator winding at a variable voltage, and if the stator winding is not operated at a variable voltage, the problem that the maximum value of the electric power that can be generated from the auxiliary winding decreases does not arise. Further, since the generator is a synchronous machine, there is a problem that excitation requires a brush.

The present invention has been made in view of the above problems, and an object thereof is to provide a drive system that is provided with an induction generator having a primary winding including a main winding and an auxiliary winding and a secondary conductor, can vary the voltage of the main winding, and can increase the maximum output power of the auxiliary winding.

Means for Solving the Problem

In order to achieve the above object, the present invention provides a drive system provided with an induction generator having a primary winding including a main winding and an auxiliary winding and a secondary conductor, the drive system including: a starting battery that starts the induction generator; a traction inverter that drives a traction motor; an auxiliary device inverter that drives an auxiliary device motor; a rectifier an input side of which is connected to the main winding and an output side of which is connected to the traction inverter; and a power generation inverter an output side of which is connected to the auxiliary winding and an input side of which is connected to the auxiliary device inverter and the starting battery.

According to the present invention configured as described above, since the starting battery is independent of the main winding of the induction generator, the voltage on the main winding side of the induction generator can be varied, and the output electric power of the auxiliary winding can be increased by changing the frequency of the auxiliary winding by the power generation inverter.

Advantages of the Invention

According to the present invention, in a drive system using an induction generator having a primary winding including a main winding and an auxiliary winding, the voltage of the main winding can be varied, and the maximum output power of the auxiliary winding can be increased.

MODES FOR CARRYING OUT THE INVENTION

Hereinafter, embodiments of the present invention will be described with reference to the drawings. It should be noted that equivalent elements will be denoted by the same signs in each drawing, and the duplicated explanation thereof will be appropriately omitted.

First Embodiment

As a drive system according to a first embodiment of the present invention, a drive system of an electrically-driven dump truck will be described as an example.

Figure 1:
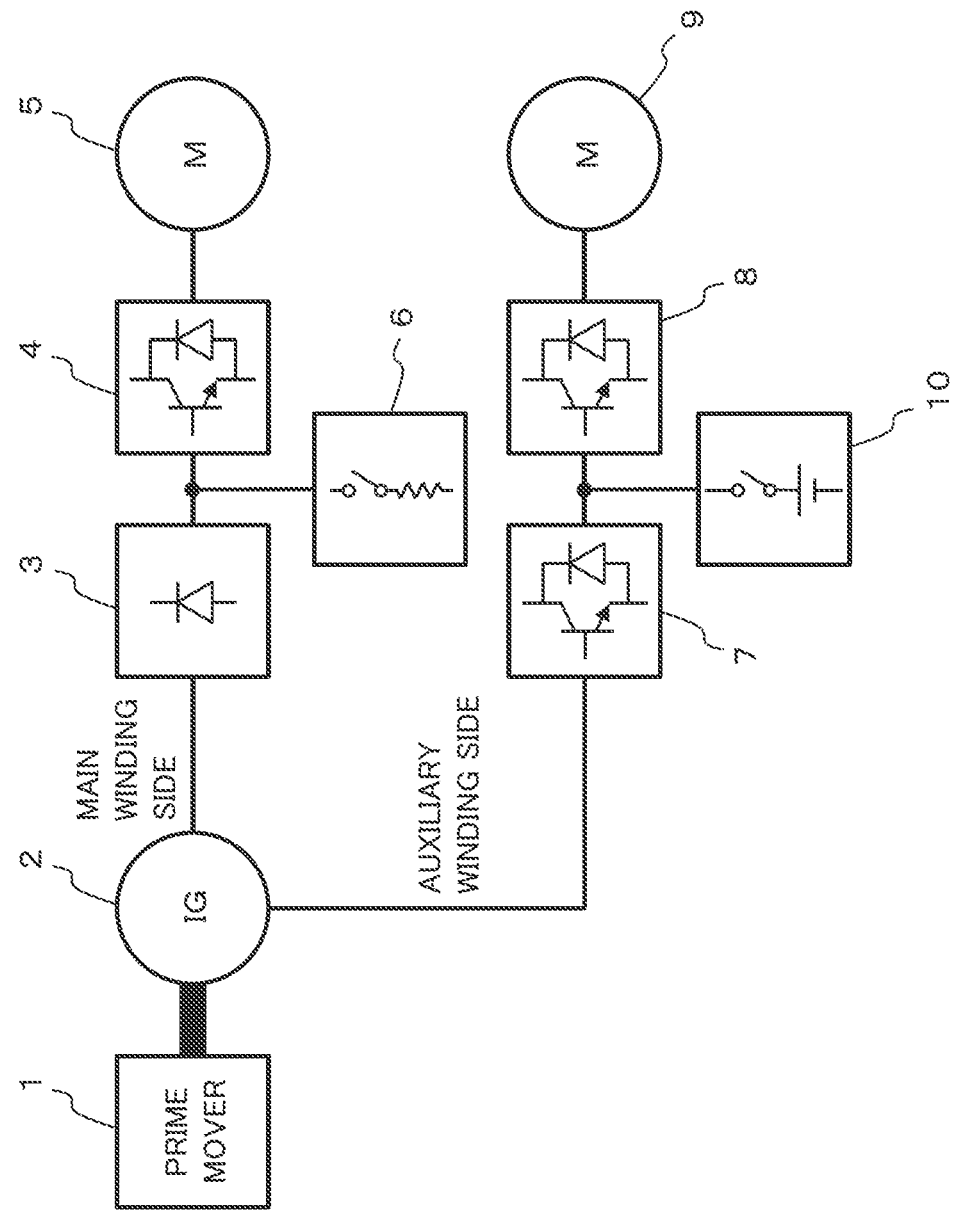
FIG. 1 is a configuration diagram of a drive system according to a first embodiment of the present invention.

FIG. 1 is a configuration diagram of the drive system according to the embodiment. In FIG. 1, the drive system includes an induction generator (two-winding induction generator) 2, a starting battery 10 for starting the two-winding induction generator 2, a traction inverter 4 for driving a traction motor 5, an auxiliary device inverter 8 for driving an auxiliary device motor 9, a rectifier 3, and a power generation inverter 7. The two-winding induction generator 2 is driven by a prime mover 1. The two-winding induction generator 2 has a primary winding including a main winding and an auxiliary winding, and a secondary conductor. Since the two-winding induction generator 2 has the primary winding including the main winding and the auxiliary winding, the drive system is simplified and the cost is reduced as compared with that using two of a main generator and an auxiliary generator.

The rectifier 3 has an input side connected to the main winding of the two-winding induction generator 2 and an output side connected to the traction inverter 4 and a regenerative resistor 6. The regenerative resistor 6 discharges electric power generated by the regenerative operation of the traction motor 5. The power generation inverter 7 has an output side connected to the auxiliary winding of the two-winding induction generator 2 and an input side connected to the auxiliary device inverter 8 and the starting battery 10. The starting battery 10 supplies electric power to the power generation inverter 7 when the two-winding induction generator 2 is started.

Since the main winding of the two-winding induction generator 2 is connected to the traction inverter 4 only via the rectifier 3 without via a battery that needs to be set to a constant voltage and is not connected to an electric power system that needs to be set to a constant voltage, it is not necessary to set the main winding of the two-winding induction generator 2 to a constant voltage.

The voltages of the main winding and the auxiliary winding of the two-winding induction generator 2 are roughly proportional. Therefore, by changing the voltage of the auxiliary winding of the two-winding induction generator 2 by the power generation inverter 7, the main winding of the two-winding induction generator 2 can be set to a variable voltage. As described above, the power generation inverter 7 is excited from the auxiliary winding of the two-winding induction generator 2, and thus brushless can be realized.

The electric power required by the traction inverter 4 is larger than that required by the auxiliary device inverter 8, and thus, as inverters more expensive than rectifiers, connection to the auxiliary device inverter 8, which requires less electric power, is less expensive than connection to the traction inverter 4.

After the start of the two-winding induction generator 2 is completed, the starting battery 10 is disconnected from the auxiliary device inverter 8, and thus the voltage required by the auxiliary device inverter 8 can be made different in magnitude from the starting battery 10.

The auxiliary device inverter 8 requires a constant voltage, but the auxiliary winding of the two-winding induction generator 2 is set to a variable voltage. Since the power generation inverter 7 can boost the voltage of the auxiliary winding of the two-winding induction generator 2, operation is possible at the voltage required by the auxiliary device inverter 8 by designing the two-winding induction generator 2 such that the voltage of the auxiliary winding of the two-winding induction generator 2 becomes smaller than the voltage required by the auxiliary device inverter 8.

Figure 2:
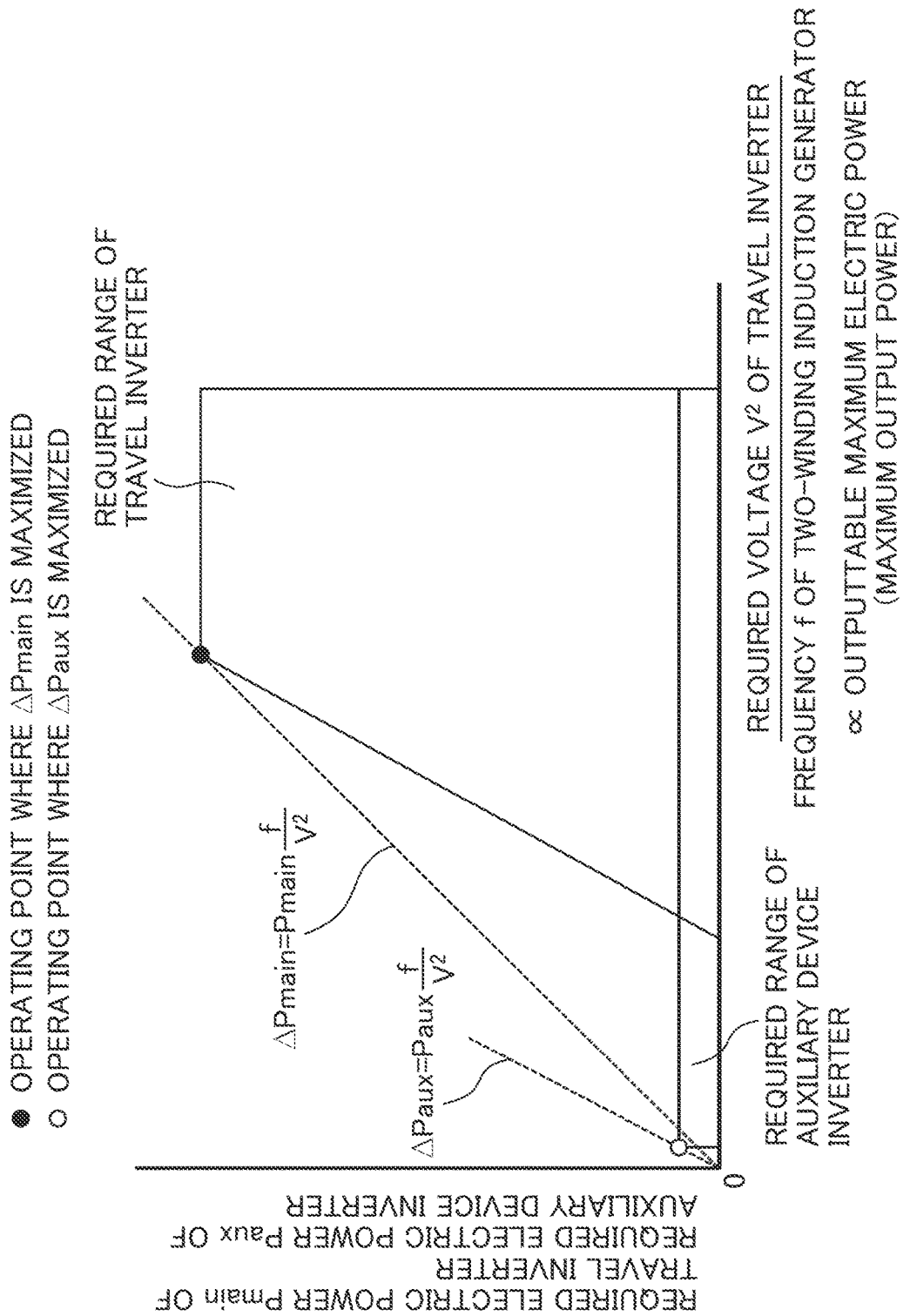
FIG. 2 is an explanatory diagram for showing a relation between the required voltage of a traction inverter and the required electric power of the traction inverter and an auxiliary device inverter.

FIG. 2 is an explanatory diagram for showing a relation between the required voltage of the traction inverter 4 and the electric power required by the traction inverter 4 and the auxiliary device inverter 8. The horizontal axis represents a quotient obtained by dividing the square of the voltage V required by the traction inverter 4 by the frequency f of the two-winding induction generator 2, and the vertical axis represents electric power Pmain and Paux required by the traction inverter 4 and the auxiliary device inverter 8. ΔPmain is the ratio of the electric power Pmain required by the traction inverter 4 to the electric power that can be output by a main winding 2131. ΔPaux is the ratio of the electric power Paux required by the auxiliary device inverter 8 to the electric power that can be output by an auxiliary winding 2132. In FIG. 2, ΔPmain and ΔPaux are represented by the inclinations of broken lines, and the states in which ΔPmain and ΔPaux (the inclinations of the broken lines) are maximized are plotted. In FIG. 2, as ΔPmain becomes larger, it means that the margin of the output electric power of the main winding 2131 becomes smaller relative to the required electric power Pmain of the traction inverter 4 (the demand for the main winding 2131 becomes severe), and as the inclination of the ΔPaux becomes larger, it means that the margin of the output electric power of the auxiliary winding 2132 becomes smaller relative to the required electric power Paux of the auxiliary device inverter 8 (the demand for the auxiliary winding 2132 becomes severe).

In general, the magnetic flux amount (of the two-winding induction generator 2 is proportional to the voltage V and is inversely proportional to an angular frequency ω (ω=2πf, f: the frequency of the two-winding induction generator 2).

[Equation 1]

$$\Phi \sim v/\omega \quad (1)$$

A reactance X is proportional to the angular frequency ω and an inductance L.

[Equation 2]

$$X \sim \omega L \quad (2)$$

A current I is proportional to the voltage V and is inversely proportional to the reactance X.

[Equation 3]

$$I \sim V/X \quad (3)$$

A torque T is proportional to the magnetic flux amount Φ and the current I.

[Equation 4]

$$T \sim \Phi I \quad (4)$$

An output power P is proportional to the angular frequency ω and the torque T.

[Equation 5]

$$P \sim \omega T \quad (5)$$

After substituting the equation (4) into the above equation (5), if the equation (1) and the equation (3) are substituted and the equation (2) is further substituted, the output power P is represented by the following equation.

[Equation 6]

$$P \sim \omega \Phi I \sim \omega(V/\omega)(V/X) \sim \omega(V/\omega)(V/X) \sim \omega(V/(\omega))(V/(\omega L)) \sim V^2/(\omega L) \quad (5)$$

Therefore, the maximum electric power that can be output by the two-winding induction generator 2 is proportional to the quotient obtained by dividing the square of the voltage V by the frequency f. That is, the maximum electric power that can be output by the two-winding induction generator 2 is proportional to the horizontal axis of FIG. 2, and as ΔPmain and ΔPaux become larger, it becomes more severe state to output the required electric power.

The maximum value of the electric power Pmain required by the traction inverter 4 is larger than the maximum value of the electric power Paux required by the auxiliary device inverter 8. Thus, it is often assumed that the main winding side of the two-winding induction generator 2 to which the traction inverter 4 is connected becomes apparently more severe to output the electric power of the two-winding induction generator 2, but in the drive system of the electrically-driven dump truck, ΔPaux is larger than ΔPmain as shown in FIG. 2, and the auxiliary winding side of the two-winding induction generator 2 to which the auxiliary device inverter 8 is connected is more severe.

The electrically-driven dump truck is used in, for example, mines, and stops traveling during loading and dumping operations. At this time, since the drive system of the electrically-driven dump truck improves fuel economy by reducing the energy consumption of the prime mover 1, the revolution speed of the prime mover 1 is kept low and the truck becomes idle state. Since the revolution speeds of the prime mover 1 and the two-winding induction generator 2 are the same, if the revolution speed of the prime mover 1 is kept low, the frequency f of the two-winding induction generator 2 becomes low and the angular frequency ω of the equation 3 becomes low. At this time, it is necessary to lower the voltage V such that the magnetic flux amount (of the equation 3 does not become too large, and the traction inverter 4 requires a low voltage. Further, immediately after the end of idling, the revolution speed (the frequency f of the two-winding induction generator) of the prime mover 1 is maximized in some cases while the traction inverter 4 is still requiring a low voltage, and the horizontal axis of FIG. 2 is minimized at this time. At the voltage V and the frequency f where the horizontal axis is minimized, when the electric power Paux required by the auxiliary device inverter is maximized, ΔPaux is maximized, which is plotted as the most severe point on the auxiliary winding side of FIG. 2.

When the electric power Pmain required by the traction inverter 4 is the maximum and the voltage V required by the traction inverter 4 is the minimum, ΔPmain is maximized, which is plotted as the most severe point on the main winding side of FIG. 2.

As described above, the maximum electric power that can be output by the two-winding induction generator 2 is proportional to the horizontal axis of FIG. 2, and as the ΔPmain and ΔPaux become larger, it becomes more severe state to output the required electric power. As shown in FIG. 2, since the maximum value of ΔPaux is larger than the maximum value of ΔPmain, the auxiliary winding side of the two-winding induction generator 2 is more severe to output the electric power required by the inverter.

As described above, the fact that the maximum value of ΔPaux becomes larger than the maximum value of ΔPmain is a unique event in a case where the two-winding induction generator 2 is applied to the drive system of the electrically-driven dump truck.

Figure 3:
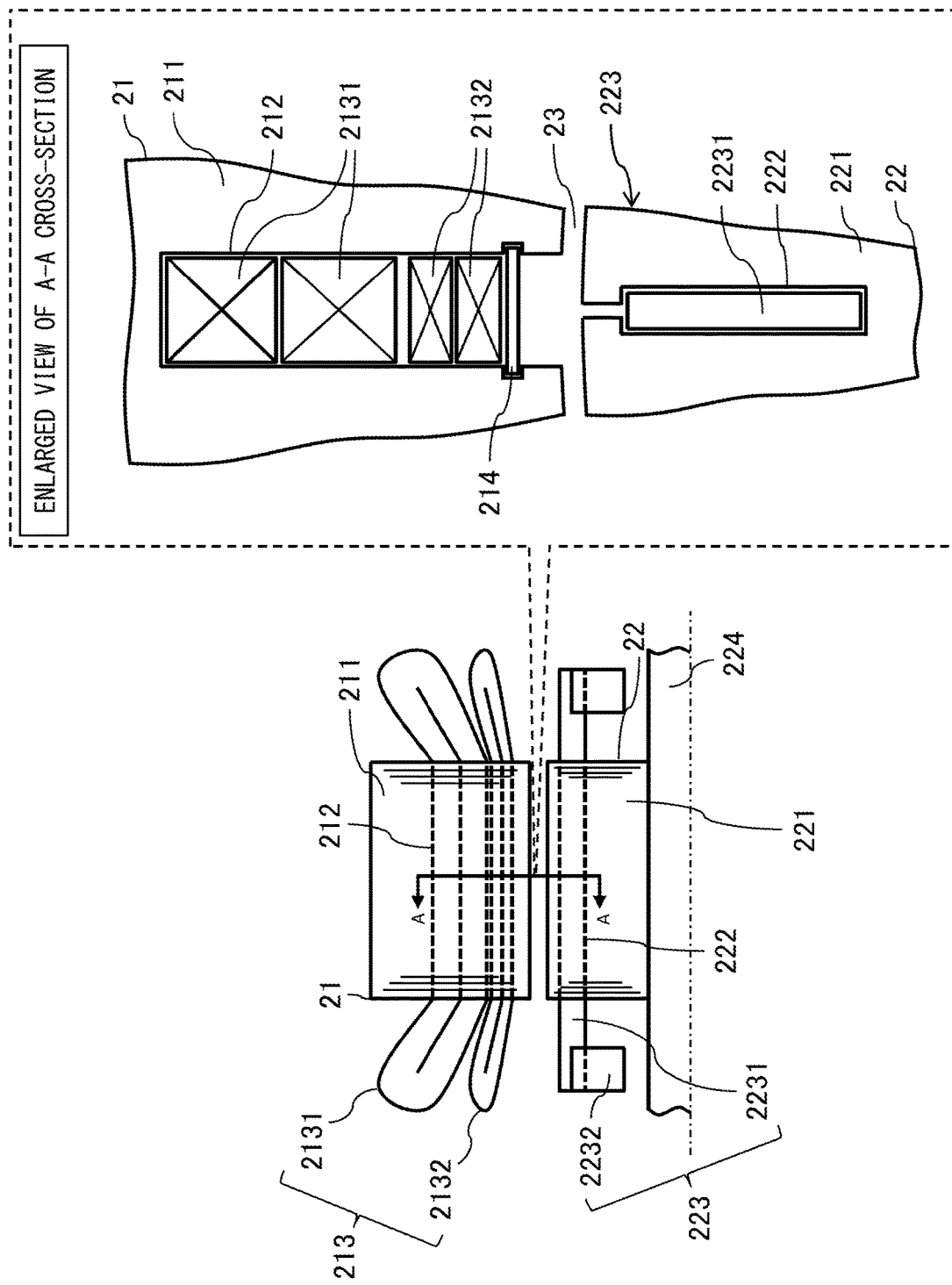
FIG. 3 is a side view and a cross-sectional view for showing the structure of a two-winding induction generator in the first embodiment of the present invention.

FIG. 3 is a side view and a cross-sectional view for showing the structure of the two-winding induction generator 2 in the embodiment. The two-winding induction generator 2 includes a stator 21 and a rotor 22, the stator 21 has a primary winding 213 installed in a stator slot 212 formed of a stator iron core 211, and the primary winding 213 has the main winding 2131 and the auxiliary winding 2132. The primary winding 213 is held in the stator slot 212 by a wedge 214. The rotor 22 has a rotor bar 2231 installed in a rotor slot 222 formed of a rotor iron core 221, and the rotor bar 2231 is short-circuited at the ends thereof by end rings 2232. A secondary conductor 223 has the rotor bar 2231 and the end rings 2232. A gap 23 is a void between the stator 21 and the rotor 22.

When the voltage of the auxiliary winding 2132 is changed by the power generation inverter 7, the magnetic flux amount passing through the stator iron core 211 or the rotor iron core 221 changes, the number of magnetic fluxes interlinking the main winding 2131 changes, the voltage of the main winding 2131 is changed, and it is possible to control to obtain the voltage required by the traction inverter 4.

When the frequency of the auxiliary winding 2132 is changed by the power generation inverter 7, the slip changes, the current of the secondary conductor 223 changes, the electric power output from the main winding 2131 and the auxiliary winding 2132 is changed, and it is possible to control to obtain the electric power required by the traction inverter 4 or the auxiliary device inverter 8.

Figure 4:
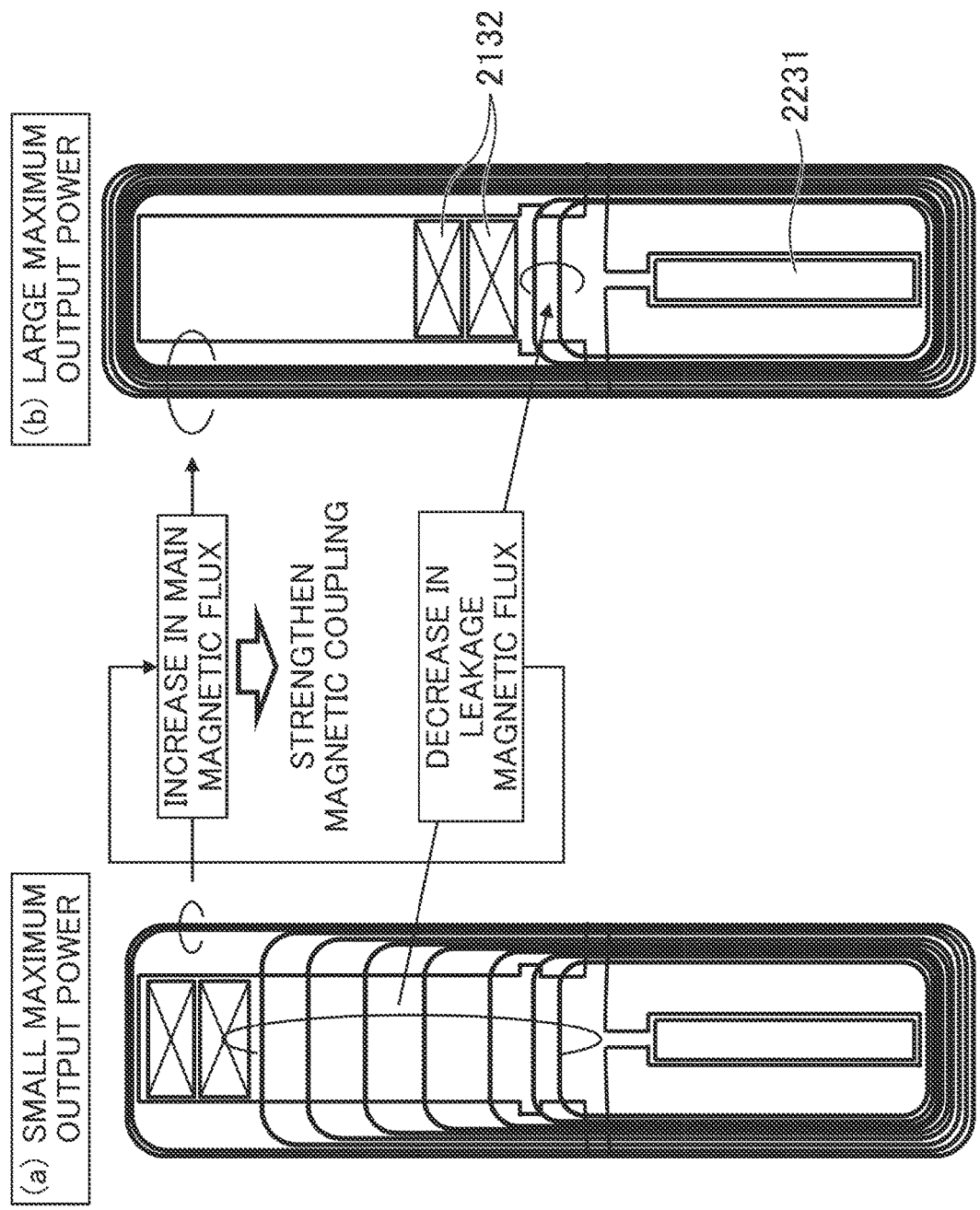
FIG. 4 is an explanatory diagram about magnetic coupling between a primary winding and a secondary conductor of the two-winding induction generator.

FIG. 4 is an explanatory diagram about magnetic coupling between the primary winding 213 and the secondary conductor 223. Although the primary winding 213 has the main winding 2131 and the auxiliary winding 2132, FIG. 4 describes only the magnetic coupling between the auxiliary winding 2132 and the secondary conductor 223. The magnetic coupling between the main winding 2131 and the secondary conductor 223 can be considered by replacing the auxiliary winding 2132 of FIG. 4 with the main winding 2131. FIG. 4(a) shows a state in which the maximum output power becomes small, FIG. 4(b) shows a state in which the maximum output power becomes large, and the embodiment shows the state of FIG. 4 (b). In FIG. 4(a), the auxiliary winding 2132 is arranged at a position separated from the rotor bar 2231, and in FIG. 4(b), the auxiliary winding 2132 is arranged at a position closer to the rotor bar 2231.

Since the gap between the auxiliary winding 2132 and the rotor bar 2231 in FIG. 4(b) is smaller (the distance is closer) than that in FIG. 4(a), the amount of magnetic flux (leakage magnetic flux) passing through the gap is smaller, and the amount of magnetic flux (main magnetic flux) interlinking the auxiliary winding becomes accordingly larger. If the main magnetic flux is increased, the magnetic coupling between the auxiliary winding 2132 and the rotor bar 2231 is enhanced, and the maximum output power becomes larger.

Therefore, as shown in FIG. 2, in a case where the electric power required for the auxiliary winding 2132 is more severe (the maximum value of ΔPaux is larger than the maximum value of ΔPmain), the auxiliary winding 2132 is arranged at a position closer to the secondary conductor 223 than the main winding 2131.

Figure 5:
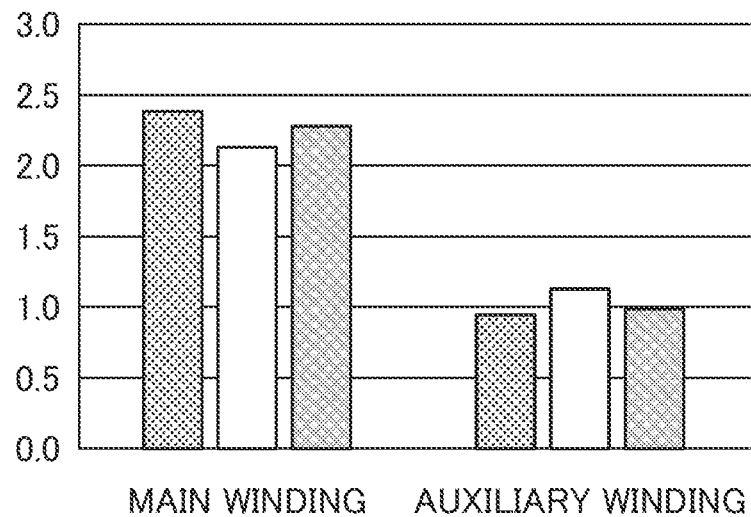
FIG. 5 is an explanatory diagram for showing measurement results of the maximum electric power that can be output by a main winding and an auxiliary winding when the maximum value of the electric power required by the traction inverter and the auxiliary device inverter is 1.

FIG. 5 is an explanatory diagram for showing measurement results of the maximum electric power that can be output by the main winding and the auxiliary winding when the maximum value of the electric power required by the traction inverter and the auxiliary device inverter is 1. A value of 1 or more on the vertical axis in the drawing means that the generator can output the electric power required by the inverter. In FIG. 5, each value of the main winding 2131 corresponds to the reciprocal of ΔPmain and each value of the auxiliary winding 2132 corresponds to the reciprocal of ΔPaux. FIG. 5 shows the measurement results in a case where the electric power required for the auxiliary winding 2132 is more severe (the maximum value of ΔPaux is larger than the maximum value of ΔPmain).

In a case where the maximum value of ΔPaux is larger than the maximum value of ΔPmain, it can be also confirmed from the measurement results in FIG. 5 that the electric power required for the auxiliary winding 2132 is more severe. That is, it can be confirmed that when the maximum value of the electric power required by the auxiliary device inverter 8 is 1, the maximum electric power (maximum output power) that can be output by the auxiliary winding 2132 is around 1, whereas when the maximum value of the electric power required by the traction inverter 4 is 1, the maximum output power of the main winding 2131 is about 2 to 2.5, which is larger than around 1 of the auxiliary winding.

By arranging the auxiliary winding 2132 at a position closer to the secondary conductor 223 than the main winding 2131 (arranging the auxiliary winding on the secondary conductor side), the maximum output power of the auxiliary winding 2132 becomes larger than arranging the auxiliary winding 2132 at a position farther away from the secondary conductor 223 than the main winding 2131 (arranging the auxiliary winding on the side opposite to the secondary conductor). This is because the magnetic coupling with the secondary conductor 223 is strengthened by arranging the auxiliary winding 2132 closer to the secondary conductor 223.

By arranging the auxiliary winding 2132 at a position closer to the secondary conductor 223 than the main winding 2131 (arranging the auxiliary winding on the secondary conductor side) as shown in FIGS. 4, it is confirmed that the maximum output power of the auxiliary winding 2132 exceeds the maximum value of the electric power required by the auxiliary device inverter 8.

Effect

In the embodiment, the drive system, which is provided with the induction generator 2 having the primary winding 213 including the main winding 2131 and the auxiliary winding 2132 and the secondary conductor 223, includes: the starting battery 10 that starts the induction generator 2; the traction inverter 4 that drives the traction motor 5; the auxiliary device inverter 8 that drives the auxiliary device motor 9; the rectifier 3 the input side of which is connected to the main winding 2131 and the output side of which is connected to the traction inverter 4; and the power generation inverter 7 the output side of which is connected to the auxiliary winding 2132 and the input side of which is connected to the auxiliary device inverter 8 and the starting battery 10.

According to the embodiment configured as described above, since the starting battery 10 is independent of the main winding 2131 of the induction generator 2, the voltage of the main winding 2131 of the induction generator 2 can be varied, and the output electric power of the auxiliary winding 2132 can be increased by changing the frequency of the auxiliary winding 2132 by the power generation inverter 7.

In addition, in the embodiment, the maximum value of the ratio ΔPaux of the required electric power Paux of the auxiliary device inverter 8 to the output electric power of the auxiliary winding 2132 is larger than the maximum value of the ratio ΔPmain of the required electric power Pmain of the traction inverter 4 to the output electric power of the main winding 2131, and the auxiliary winding 2132 is arranged at a position closer to the secondary conductor 223 than the main winding 2131. Accordingly, since the main winding 2131 is arranged on the side opposite to the secondary conductor and the auxiliary winding 2132 becomes closer to the secondary conductor 223, the magnetic coupling between the auxiliary winding 2132 and the secondary conductor 223 is strengthened, and the power factor of the electric power output from the auxiliary winding 2132 is improved. If the power factor is improved, the current required to output the same active electric power is reduced, and thus it is possible to suppress the temperature rise in the auxiliary winding 2132.

Second Embodiment

Figure 6:
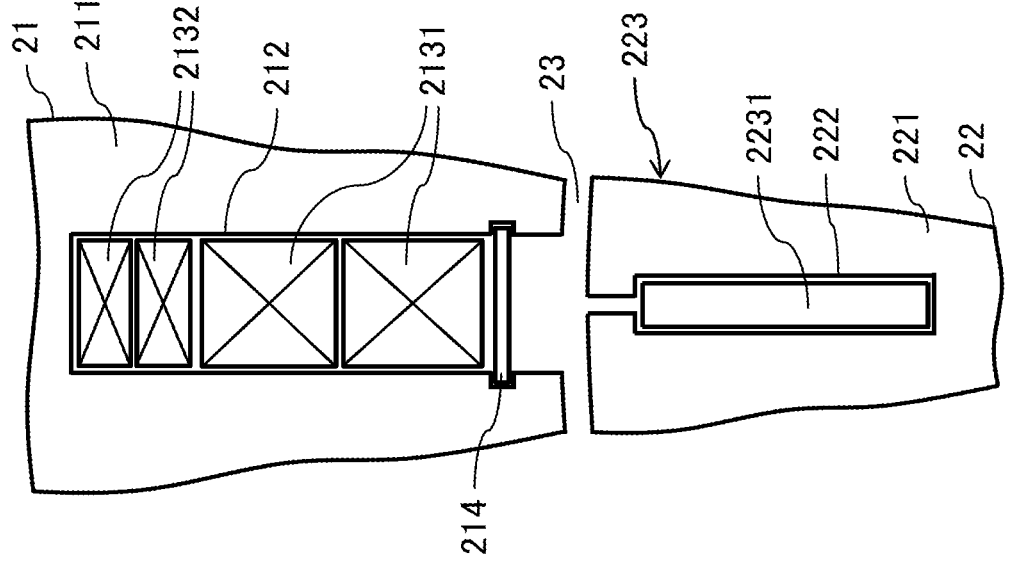
FIG. 6 is a cross-sectional view for showing the structure of a two-winding induction generator in a second embodiment of the present invention.

A second embodiment of the present invention will be described while focusing on the differences from the first embodiment. FIG. 6 is a cross-sectional view for showing the structure of a two-winding induction generator 2 in the embodiment.

In a case where the electric power required for the main winding 2131 is more severe (the maximum value of ΔPmain is larger than the maximum value of ΔPaux), the auxiliary winding 2132 is arranged at a position farther away from the secondary conductor 223 than the main winding 2131 as shown in FIG. 6. In a case where the electric power required for the main winding 2131 is more severe (the maximum value of ΔPmain is larger than the maximum value of ΔPaux), the electric power required for the main winding 2131 is more severe than that required for the auxiliary winding 2132, and thus the maximum output power of the main winding 2131 is improved.

By arranging the auxiliary winding 2132 at a position farther away from the secondary conductor 223 than the main winding 2131 (arranging the auxiliary winding on the side opposite to the secondary conductor), the maximum output power of the main winding 2131 is improved as shown in FIG. 5.

Effect

In the embodiment, the maximum value of the ratio ΔPmain of the required electric power Pmain of the traction inverter 4 to the output electric power of the main winding 2131 is larger than the maximum value of the ratio ΔPaux of the required electric power Paux of the auxiliary device inverter 8 to the output electric power of the auxiliary winding 2132, and the main winding 2131 is arranged at a position closer to the secondary conductor 223 than the auxiliary winding 2132.

According to the embodiment configured as described above, since the auxiliary winding 2132 is arranged on the side opposite to the secondary conductor and the main winding 2131 becomes closer to the secondary conductor 223, the magnetic coupling between the main winding 2131 and the secondary conductor 223 is strengthened, and the power factor of the electric power output from the main winding 2131 is improved. If the power factor is improved, the current required to output the same active electric power is reduced, and thus it is possible to suppress the temperature rise in the main winding 2131 and reduce the size of the two-winding induction generator 2.

Third Embodiment

Figure 7:
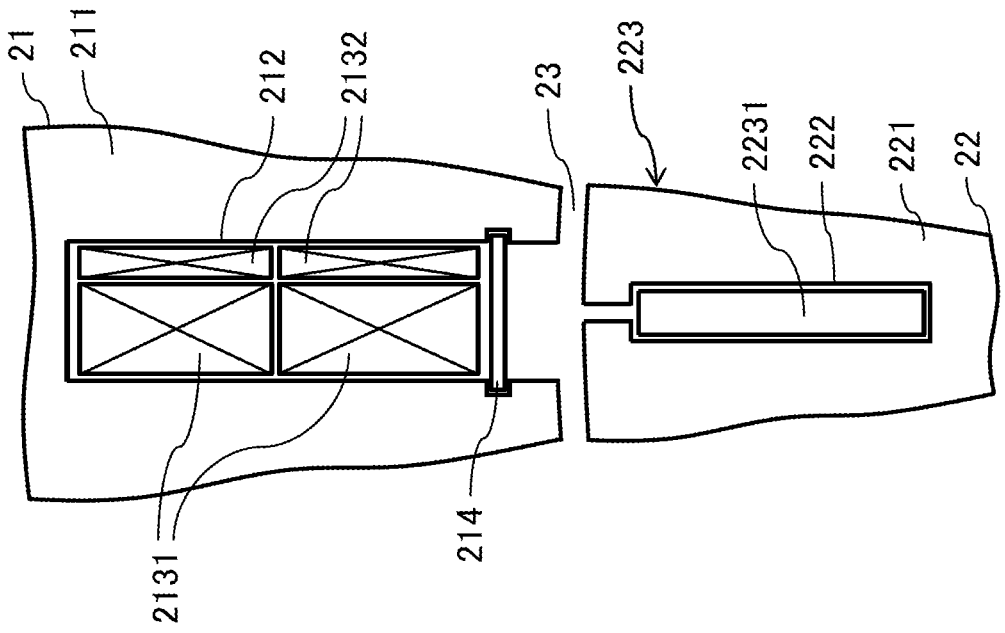
FIG. 7 is a cross-sectional view for showing the structure of a two-winding induction generator in a third embodiment of the present invention.

A second embodiment of the present invention will be described while focusing on the differences from the first embodiment. FIG. 7 is a cross-sectional view for showing the structure of a two-winding induction generator 2 in the embodiment.

In a case where it is not clear which of the electric power required for the main winding 2131 and the auxiliary winding 2132 is more severe (the maximum value of ΔPmain and the maximum value of ΔPaux are not clear), the auxiliary winding 2132 and the main winding 2131 are arranged at positions where the distances from the secondary conductor 223 are equal to each other as shown in FIG. 7. It should be noted that "arrangement of auxiliary winding side by side with main winding" in FIG. 5 means the arrangement in FIG. 7.

By arranging the auxiliary winding 2132 and the main winding 2131 at positions where the distances from the secondary conductor 223 are equal to each other, the tendency similar to FIG. 5 can be obtained. That is, intermediate characteristics between when the auxiliary winding is arranged on the side opposite to the secondary conductor and when the auxiliary winding is arranged on the secondary conductor side can be obtained, and the maximum output power of the auxiliary winding 2132 and the maximum output power of the main winding 2131 can be balanced.

Effect

In the embodiment, the main winding 2131 and the auxiliary winding 2132 are arranged such that the distances from the secondary conductor 223 are equal to each other.

According to the embodiment configured as described above, the maximum output power of the auxiliary winding 2132 and the maximum output power of the main winding 2131 can be balanced without prioritizing the characteristics of either the auxiliary winding 2132 or the main winding 2131, so that even in a case where the voltage or electric power required by the traction inverter 4 or the auxiliary device inverter 8 is changed, it is possible to respond to the change without changing the specifications of the induction generator 2.

Fourth Embodiment

Figure 8:
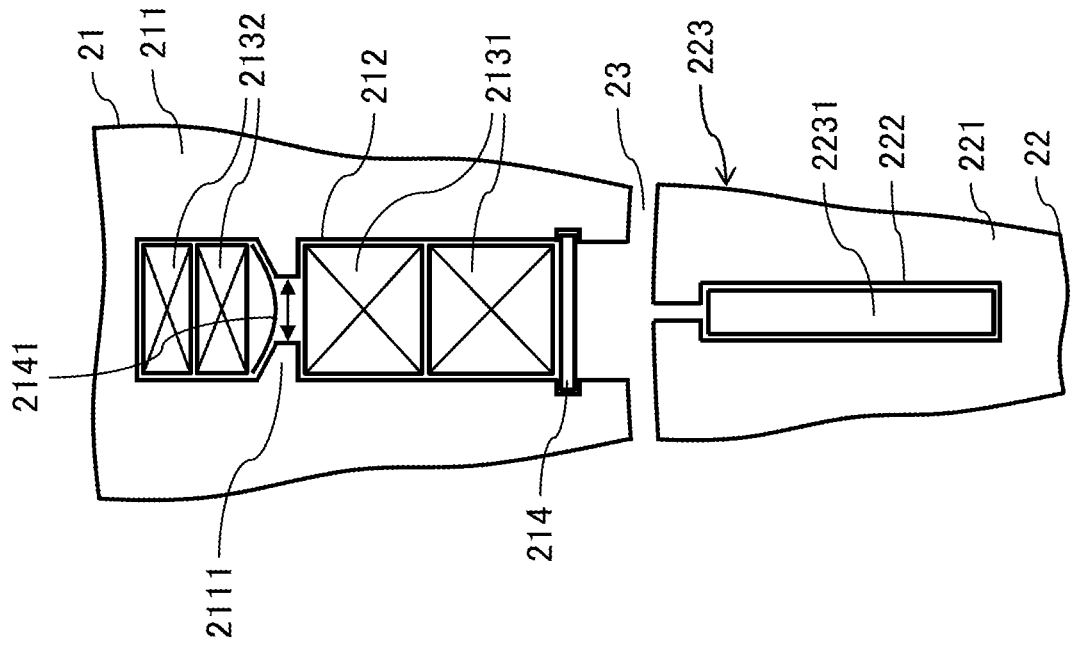
FIG. 8 is a cross-sectional view for showing the structure of a two-winding induction generator in a fourth embodiment of the present invention.

A fourth embodiment of the present invention will be described while focusing on the differences from the second embodiment. FIG. 8 is a cross-sectional view for showing the structure of a two-winding induction generator 2 in the embodiment.

As shown in FIG. 8, in a case where the auxiliary winding 2132 is arranged at a position farther away from the secondary conductor 223 than the main winding 2131, a stator iron core projecting part 2111 is provided between the main winding 2131 and the auxiliary winding 2132, and an insulator 2141 is provided between the stator iron core projecting part 2111 and the auxiliary winding 2132 to prevent the auxiliary winding 2132 from falling off. Accordingly, it is possible to prevent the auxiliary winding 2132 from falling off from the stator slot 212 between the time at which the auxiliary winding 2132 is incorporated into the stator slot 212 and the time at which the main winding 2131 is incorporated, and the incorporation work of the main winding 2131 can be facilitated. The voltage of the auxiliary winding 2132 is set to be a low voltage such as several hundred volts, such that enamel insulation can be used for the auxiliary winding 2132. A plurality of enamel-insulated wires is used for the auxiliary winding 2132. Round wires are used for the enamel wires. The size (diameter) thereof is set to be smaller than the width (indicated by a double-headed arrow in the drawing) of the stator slot 212 in the portion where the stator iron core projecting part 2111 is provided.

By providing the stator iron core projecting part 2111 between the main winding 2131 and the auxiliary winding 2132, the amount of magnetic flux (leakage magnetic flux) passing between the main winding 2131 and the auxiliary winding 2132 is increased, the magnetic coupling between the main winding 2131 and the auxiliary winding 2132 is weakened, and the magnetic interference occurring between the both windings can be suppressed.

The voltage of the main winding 2131 is set to be a high voltage of such as order of kV magnitude, such that a MW-class large-capacity machine can be used for the traction motor 5. A plurality of square electric wires insulated with glass or mica is used for the main winding 2131. In this case, since the main winding 2131 is formed by bundling the plurality of square wires and then incorporated into the stator iron core 211, a projecting part cannot be provided to the stator iron core 211 on the gap side of the main winding 2131. Therefore, it is necessary to prevent the main winding 2131 from falling off by providing a recessed part to the stator iron core 211 to fix the wedge 214.

Effect

In the embodiment, the stator iron core 211 having the stator slot 212 in which the primary winding 213 is installed and the rotor iron core 221 having the rotor slot 222 in which the secondary conductor 223 is installed are provided, the stator slot 212 has the stator iron core projecting part 2111 formed to project between the auxiliary winding 2132 and the main winding 2131, and the insulator 2141 is installed between the stator iron core projecting part 2111 and the main winding 2132.

According to the embodiment configured as described above, since it is possible to prevent the auxiliary winding 2132 from falling off from the stator slot 212 between the time at which the auxiliary winding 2132 is incorporated into the stator iron core 211 and the time at which the main winding 2131 is incorporated, the incorporation work of the main winding 2131 can be facilitated. In addition, by providing the stator iron core projecting part 2111 between the main winding 2131 and the auxiliary winding 2132, the amount of magnetic flux (leakage magnetic flux) passing between the main winding 2131 and the auxiliary winding 2132 is increased, the magnetic coupling between the main winding 2131 and the auxiliary winding 2132 is weakened, and the magnetic interference occurring between the both windings can be suppressed.

Although the embodiments of the present invention have been described above in detail, the present invention is not limited to the above-described embodiments and includes various modified examples. For example, the above-described embodiments have been described in detail in order to clearly describe the present invention, and are not necessarily limited to those having all the described configurations. In addition, it is also possible to add a part of the configuration of one embodiment to the configuration of another embodiment, and to delete a part of the configuration of one embodiment or to replace a part of the configuration of one embodiment with a part of another embodiment.

DESCRIPTION OF REFERENCE CHARACTERS

1: Prime mover
2: Two-winding induction generator
3: Rectifier
4: Traction inverter
5: Traction motor
6: Regenerative resistor
7: Power generation inverter
8: Auxiliary device inverter
9: Auxiliary device motor
10: Starting battery
21: Stator
211: Stator iron core
212: Stator slot
213: Primary winding
2131: Main winding
2132: Auxiliary winding
214: Wedge
22: Rotor
221: Rotor iron core
222: Rotor slot
223: Secondary conductor
2231: Rotor bar
2232: End ring
224: Shaft
23: Gap

The invention claimed is:

1. A drive system provided with an induction generator having a primary winding including a main winding and an auxiliary winding and a secondary conductor, the drive system comprising:
   a starting battery that starts the induction generator;
   a traction inverter that drives a traction motor;
   an auxiliary device inverter that drives an auxiliary device motor;
   a rectifier an input side of which is connected to the main winding and an output side of which is connected to the traction inverter; and
   a power generation inverter an output side of which is connected to the auxiliary winding and an input side of which is connected to the auxiliary device inverter and the starting battery.

2. The drive system according to claim 1, wherein
   a maximum value of a ratio of required electric power of the auxiliary device inverter to output electric power of the auxiliary winding is larger than a maximum value of a ratio of required electric power of the traction inverter to output electric power of the main winding, and
   the auxiliary winding is arranged at a position closer to the secondary conductor than the main winding.

3. The drive system according to claim 1, wherein
   a maximum value of a ratio of required electric power of the traction inverter to output electric power of the main winding is larger than a maximum value of a ratio of required electric power of the auxiliary device inverter to output electric power of the auxiliary winding, and
   the main winding is arranged at a position closer to the secondary conductor than the auxiliary winding.

4. The drive system according to claim 3, wherein
   a stator iron core having a stator slot in which the primary winding is installed and
   a rotor iron core having a rotor slot in which the secondary conductor is installed are provided,
   the stator slot has a stator iron core projecting part formed to project between the auxiliary winding and the main winding, and
   an insulator is installed between the stator iron core projecting part and the main winding.

5. The drive system according to claim 1, wherein
   the main winding and the auxiliary winding are arranged at equal distances from the secondary conductor.

* * * * *